(12) United States Patent
Lim

(10) Patent No.: US 8,537,155 B2
(45) Date of Patent: Sep. 17, 2013

(54) IMAGE PROCESSING APPARATUS AND METHOD

(75) Inventor: Hwa Sup Lim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 694 days.

(21) Appl. No.: 12/662,855

(22) Filed: May 6, 2010

(65) Prior Publication Data

US 2010/0328307 A1 Dec. 30, 2010

(30) Foreign Application Priority Data

Jun. 25, 2009 (KR) .................. 10-2009-0057264

(51) Int. Cl.
*G06T 17/00* (2006.01)

(52) U.S. Cl.
USPC ........... 345/420; 345/419; 345/473; 345/581; 382/195

(58) Field of Classification Search
USPC .................. 345/419, 420, 473, 581; 382/195
See application file for complete search history.

(56) References Cited

U.S. PATENT DOCUMENTS 7,212,656 B2 * 5/2007 Liu et al. .............. 382/118
7,450,126 B2 * 11/2008 Marschner et al. ......... 345/473

FOREIGN PATENT DOCUMENTS

| JP | 2007-102601 | 4/2007 |
| JP | 2007-257324 | 10/2007 |
| KR | 10-2002-0049504 | 6/2002 |
| KR | 10-2006-0064553 | 6/2006 |
| KR | 10-2006-0082984 | 7/2006 |

OTHER PUBLICATIONS

Pyun et al. "An Example-Based Approach for Facial Expression Cloning". Published 2003.*
Chai et al. "Vision-based Control of 3D Facial Animation". Published 2003.*
Noh et al. "Expression Cloning". ACM 2001.*

* cited by examiner

*Primary Examiner* — Kimbinh T Nguyen
(74) *Attorney, Agent, or Firm* — Staas & Halsey LLP

(57) ABSTRACT

An image processing apparatus. The image processing apparatus may generate a texture by synthesizing a facial area of an input color image and a template texture, generate a mesh model by matching a template mesh model corresponding to the template texture and a depth image corresponding to the input color image, and generate a three-dimensional (3D) facial model based on the texture and the mesh model.

20 Claims, 16 Drawing Sheets
(14 of 16 Drawing Sheet(s) Filed in Color)

300

300

600

700

1100

1500

IMAGE PROCESSING APPARATUS AND METHOD

CROSS-REFERENCE TO RELATED APPLICATIONS

This application claims the benefit of Korean Patent Application No. 10-2009-0057264, filed on Jun. 25, 2009, in the Korean Intellectual Property Office, the disclosure of which is incorporated herein by reference.

BACKGROUND

1. Field

One or more embodiments relate to a three-dimensional (3D) image processing, and more particularly, to an image processing apparatus and method that may perform 3D modeling for a face of a human being.

2. Description of the Related Art

Currently, with the developments in image processing technologies, many people have interest in three dimensional (3D) modeling a face of a human being. 3D modeling of the human face may be used for a virtual reality, a computer graphic in a movie and a game, and the like.

For 3D modeling of the human face, a scheme of scanning spatial information associated with the human face using a laser scanner, a scheme of synthesizing color images obtained using a plurality of color cameras, and the like are generally used in the art.

However, the above schemes generally need a particular photographing environment or a relatively long processing time for 3D modeling, and thus there are constraints on utilization of the above schemes.

Accordingly, there is a need for a method that may outperform the above limitations to perform 3D modeling for a face of a human being.

SUMMARY

One or more embodiments may provide an image processing apparatus and method that may generate a three dimensional (3D) facial model of a human being in a relatively quick period of time, without a need for a particular photographing environment, and thereby enhance an efficiency of 3D modeling.

One or more embodiments may also provide an image processing apparatus and method that may apply characteristics such as a hair and a skin tone for 3D modeling of a human face and thereby enhance a quality of 3D modeling.

According to an aspect of one or more embodiments, there may be provided an image processing apparatus, including a first processor to generate a first texture by synthesizing a template texture and a facial area extracted from an input color image, a second processor to generate a first mesh model by matching both a template mesh model corresponding to the template texture and a depth image corresponding to the input color image, and a 3D model generator to generate a 3D facial model based on the first texture and the first mesh model.

The first processor may include an extractor to extract a characteristic point of the input color image identifying the facial area within the input color image, a first calculator to calculate a first transform function between the characteristic point of the input color image and a characteristic point of the template texture, and a texture synthesizer to generate the first texture by synthesizing the facial area and the template texture through an application of the first transform function to pixels of the facial area of the input color image.

The extractor may extract the characteristic point of the input color image using an active shape model. The first calculator may calculate the first transform function using a radial basis function network.

The texture synthesizer may adjust a color tone of the template texture using a color tone of the facial area of the input color image.

The second processor may include a second calculator to calculate a second transform function between a characteristic point of the template mesh model corresponding to the template texture and a characteristic point of the depth image corresponding to the input color image, and a mesh matching unit to generate the first mesh model by matching the template mesh model and the depth image through an application of the second transform function to an entire set of vertexes of the template mesh model.

In this case, the second calculator may calculate the second transform function using a radial basis function network.

The 3D model generator may extract a hair portion from the input color image, select, from a plurality of pre-stored hair models, a hair model having a hair portion similar to the extracted hair portion, and synthesize the selected hair model with the 3D facial model.

According to another aspect of one or more embodiments, there may be provided an image processing apparatus including a first processor to generate a first texture by synthesizing a template texture and a facial area extracted from an input color image, a second processor to transform, to a first mesh model, a template mesh model corresponding to the template texture, and a 3D model generator to generate a 3D facial model based on the first mesh model and the template texture.

According to still another aspect of one or more embodiments, there may be provided an image processing method, including generating a first texture by synthesizing a template texture and a facial area extracted from an input color image, generating a first mesh model by matching both a template mesh model corresponding to the template texture and a depth image corresponding to the input color image, and generating a 3D facial model based on the first texture and the first mesh model.

The generating of the first texture may include extracting a characteristic point of the input color image identifying the facial area within the input color image, calculating a first transform function between the characteristic point of the input color image and a characteristic point of the template texture, and generating the first texture by synthesizing the facial area and the template texture through an application of the first transform function to pixels of the facial area of the input color image.

The characteristic point of the input color image may be extracted using an active shape model.

The first transform function may be calculated using a radial basis function network.

The generating of the first texture may further include adjusting a color tone of the template texture using a color tone of the facial area of the input color image.

The generating of the first mesh model may include calculating a second transform function between a characteristic point of the template mesh model corresponding to the template texture and a characteristic point of the depth image corresponding to the input color image, and generating the first mesh model by matching the template mesh model and the depth image through an application of the second transform function to an entire set of vertexes of the template mesh model.

The second transform function may be calculated using a radial basis function network.

The generating of the 3D facial model may include extracting a hair portion from the input color image, selecting, from a plurality of pre-stored hair models, a hair model having a hair portion similar to the extracted hair portion, and synthesizing the selected hair model with the 3D facial model.

According to yet another aspect of one or more embodiments, there may be provided an image processing method, including generating a first texture by synthesizing a template texture and a facial area extracted from an input color image, and generating a 3D facial model based on the first texture and a template mesh model corresponding to the template texture.

The generating of the 3D facial model may include transforming, to a first mesh model, the template mesh model corresponding to the template texture, and generating the 3D facial model based on the first mesh model and the template texture.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects and advantages will become apparent and more readily appreciated from the following description of the embodiments, taken in conjunction with the accompanying drawings of which.

DETAILED DESCRIPTION

Figure 1:
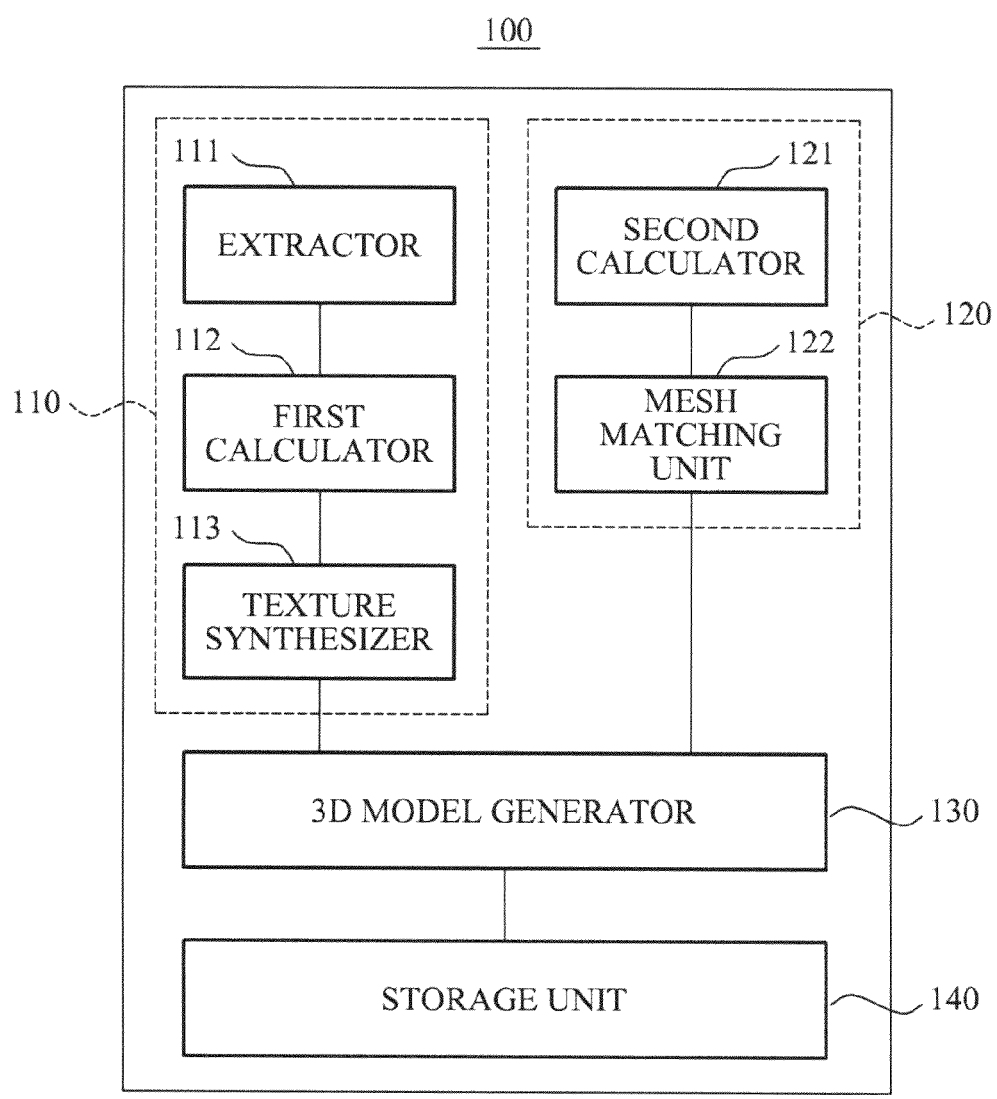
FIG. 1 illustrates a configuration of an image processing apparatus according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of an image processing apparatus 100 according to an embodiment.

The image processing apparatus 100 may include a first processor 110, a second processor 120, and a three dimensional (3D) model generator 130.

The first processor 110 may generate a first texture by synthesizing a template texture and a facial area extracted from an input color image.

According to an embodiment, the first processor 110 may include an extractor 111, a first calculator 112, and a texture synthesizer 113. The extractor 111 may extract a characteristic point of the input color image identifying the facial area within the input color image. The first calculator 112 may calculate a first transform function between the characteristic point of the input color image and a characteristic point of the template texture. The texture synthesizer 113 may generate the first texture by synthesizing the facial area and the template texture through an application of the first transform function to pixels of the facial area of the input color image.

The extractor 111 may extract the characteristic point of the input color image using an active shape model, which is described later with reference to FIG. 4.

The first calculator 112 may calculate the first transform function using a radial basis function network, which is described later with reference to FIGS. 5 and 6.

The texture synthesizer 113 may apply the first transform function calculated by the first calculator 112 to the facial area of the input color image extracted by the extractor 111, and synthesize the template texture and the facial area, and thereby generate the first texture.

In synthesizing of the first texture, a color tone of the template texture may be adjusted using information associated with a color tone of the extracted facial area and the like.

The second processor 120 may generate a first mesh model by matching both a template mesh model corresponding to the template texture, and a depth image corresponding to the input color image.

According to an embodiment, the second processor 120 may include a second calculator 121 and a mesh matching unit 122. The second calculator 121 may calculate a second transform function between a characteristic point of the template mesh model corresponding to the template texture and a characteristic point of the depth image corresponding to the input color image. The mesh matching unit 122 may generate the first mesh model by matching the template mesh model and the depth image through an application of the second transform function to the entire set of vertexes of the template mesh model.

The second calculator 121 may calculate the second transform function using a radial basis function network. The mesh matching unit 122 may generate the first mesh model by applying the calculated second transform function to the entire set of vertexes of the template mesh model, which is further described in detail later with reference to FIGS. 7 through 11.

The 3D model generator 130 may generate a 3D facial model based on the first texture and the first mesh model.

According to an embodiment, the 3D model generator 130 may extract a hair portion from the input color image, select, from a plurality of hair models pre-stored in a storage unit 140, a hair model having a hair portion similar to the extracted hair portion, and synthesize the selected hair model with the 3D facial model. The above process is further described in detail later with reference to FIGS. 12 through 13.

As described above, the second processor 120 may generate the first mesh model by matching the template mesh model and the depth image corresponding to the input color image. However, such a generation of the first mesh model is only an example, and thus various embodiments may be applicable.

For example, the template mesh model may be generated as a first mesh model having a predetermined shape.

Figure 2:
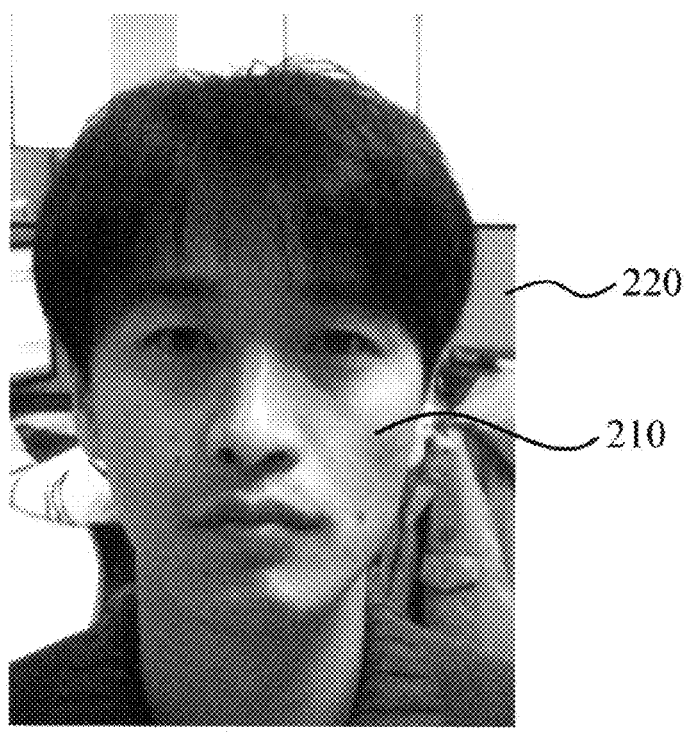
FIG. 2 illustrates an input color image input into an image processing apparatus according to an embodiment.

FIG. 2 illustrates an input color image 200 input into an image processing apparatus according to an embodiment.

The input color image 200 may include a face portion 210 of a human being and a background portion 220. A 3D facial model reflecting the face portion 210 may be generated using information associated with the face portion 210.

Figure 3:
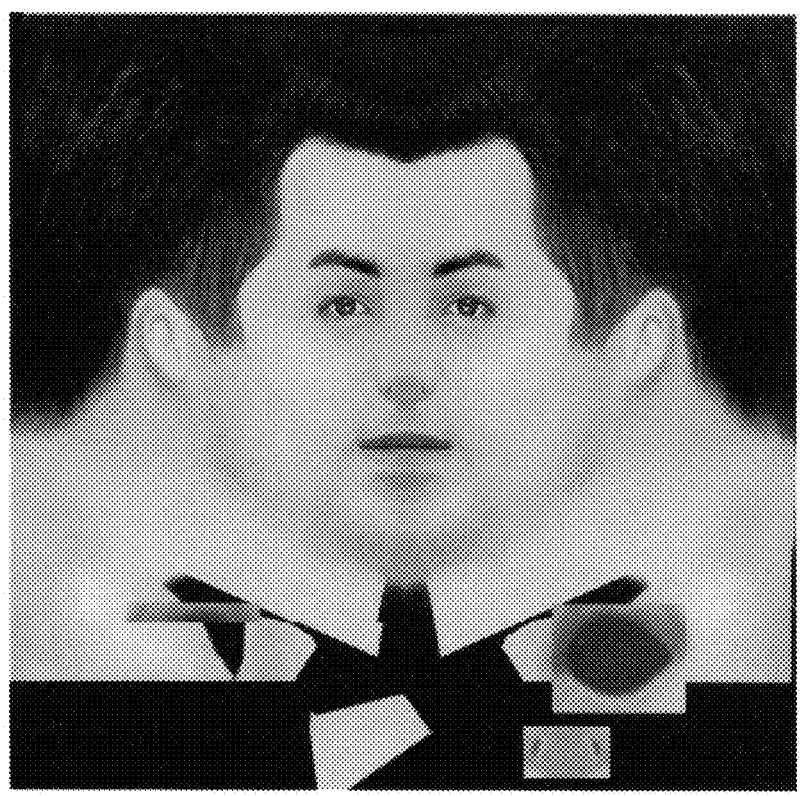
FIG. 3 illustrates a template texture used in an image processing apparatus according to an embodiment.

FIG. 3 illustrates a template texture 300 used in an image processing apparatus according to an embodiment.

A texture may indicate information excluding geometry information from information used to generate a 3D model. For example, the texture may include surface information, color information, and the like. The texture may be used to generate the 3D model together with the geometry information, for example, a mesh model.

According to an embodiment, the template texture 300 used for 3D modeling of a face of a human being may be given in advance. The template texture 300 may be different from the face of the human being to be modeled.

For example, a facial shape, locations or shapes of eyes, eyebrows, a nose, a lip, and the like are different between the template texture 300 and an actual face of the human being. When accurately performing 3D modeling using a conventional laser scanning scheme, ears and a neck as well as the facial shape, the locations or the shapes of the eyes, the eyebrows, the nose, the lip, and the like may be accurately expressed. In one implementation embodiment, there may be a need to accurately perform modeling for the head and the face of the human being.

However, in one implementation embodiment, there may exist non-critical fields with respect to accurate modeling of entire head portion, for example, an avatar in a virtual reality, a character in a video game, and the like. To perform complex image processing using a special equipment, for example, a laser scanner in the above fields may waste resources.

According to an embodiment, a new first texture may be generated by synthesizing the face portion 210 (FIG. 2) of the input color image 200 (FIG. 2) and the given template texture 300. A first mesh model may be generated by transforming a mesh model corresponding to the template texture 300 to be suitable for a depth image corresponding to the face portion 210 (FIG. 2) of the input color image 200 (FIG. 2). A 3D color model may be generated by mapping the first texture and the transformed first mesh model. Hereinafter, it will be further described in detail with reference to FIG. 4.

Figure 4:
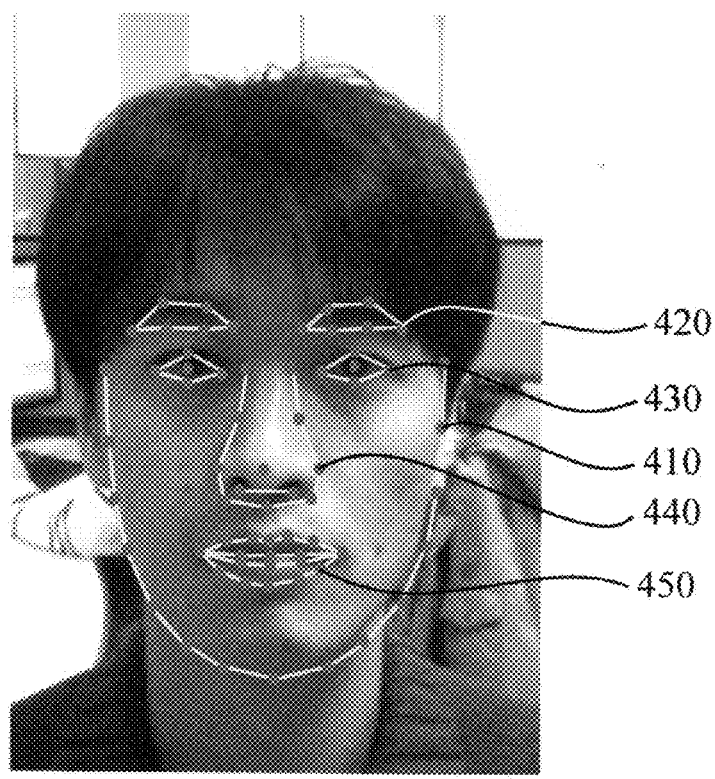
FIG. 4 illustrates an image with extracted characteristic points to identify a facial area in the input color image of FIG. 2 according to an embodiment.

FIG. 4 illustrates a result 400 of extracting characteristic points to identify a facial area in the input color image 200 of FIG. 2 according to an embodiment.

The characteristic points may be extracted using various types of algorithms.

For example, the characteristic points of the input color image 200 (FIG. 2) may be extracted by applying an active shape model to the input color image 200 (FIG. 2).

The result 400 shows the characteristic points, shown as red dots in FIG. 4, extracted by applying the active shape model to the input color image 200 (FIG. 2).

A face outline portion 410, an eyebrow portion 420, an eye portion 430, a nose portion 440, and a lip portion 450 may be identified by the illustrated extracted characteristic points.

To extract the characteristic points and identify the facial area using the active shape model is only an example. Accordingly, it is understood that it is possible to extract characteristic points and identify a facial area in an input color image using various types of schemes.

Hereinafter, a process of synthesizing the extracted facial area and the template texture will be described with reference to FIG. 5.

Figure 5:
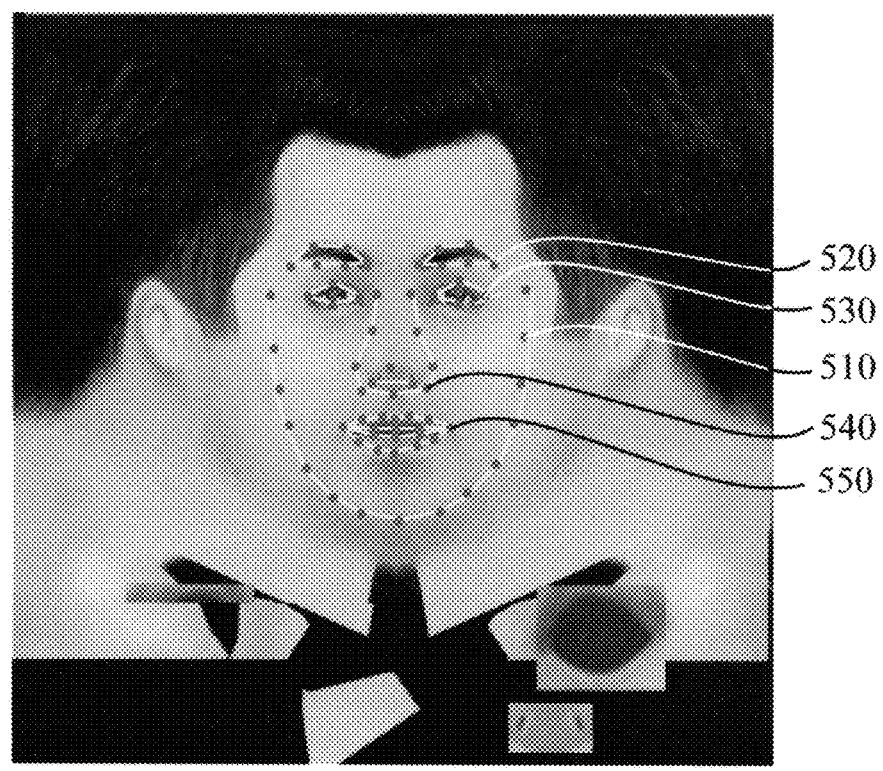
FIG. 5 illustrates an image indicating characteristic points to identify a facial area in the template texture of FIG. 3 according to an embodiment.

FIG. 5 illustrates a result 500 of indicating characteristic points to identify a facial area in the template texture 300 of FIG. 3 according to an embodiment.

The template texture 300 (FIG. 3) may be pre-stored in an image processing apparatus 100 (FIG. 1). Information regarding a face outline portion 510, an eyebrow portion 520, an eye portion 530, a nose portion 540, and a lip portion 550 may be pre-stored in the image processing apparatus. Accordingly, locations of characteristic points to identify the face outline portion 510, the eyebrow portion 520, the eye portion 530, the nose portion 540, and the lip portion 550 may be known.

According to an embodiment, the face portion 210 (FIG. 2) of the input color image 200 (FIG. 2) may be different from a face portion and a size, that is, a face outline portion of the template texture 300 (FIG. 3). Locations or sizes of an eyebrow portion, an eye portion, a noise portion, and a lip portion may be different between the input color image 200 (FIG. 2) and the template texture 300 (FIG. 3).

Accordingly, the face area extracted from the input color image 200 (FIG. 2) may be transformed and thereby be synthesized with the template texture 300 (FIG. 3). For the above transformation, a first transform function may be calculated.

The first transform function may represent a transformation relationship between the characteristic points extracted in the input color image 200 (FIG. 2), and the characteristic points existing in the template texture 300 (FIG. 3).

When the first transform function is calculated, the extracted face portion 210 (FIG. 2) may be synthesized within the template texture 300 (FIG. 3) by applying the first transform function to the entire face portion 210 (FIG. 2).

The first transform function may be calculated using a radial basis function network.

A radial function denotes a function to calculate a relationship by calculating a distance from a particular center with respect to a plurality points and thus the radial function may express a circular shape such as Gaussian.

A network to map an input value x and an output value y by using the above radial function as a basis may be referred to as the radio basis function network, which may be expressed, for example, by the following Equation 1 below.

$$y = f(x) = \sum_i w_i \phi(\|x - x_i\|) + p(x) \quad \text{Equation 1}$$

In the above Equation 1, $w_i$ denotes two dimensional (2D) image coordinates and 3D vertex coordinates that are detected in deformation of a texture and a mesh.

Here, $w_i$ may be calculated using a known $x_i$ value and $y_i$ value. Here, $x_i$ denotes a characteristic point in a color/depth image and $y_i$ denotes a characteristic point in the texture/mesh.

A y value may be obtained by inputting a distance value between xi and x into a radial basis function, and by multiplying each weight wi thereto and then calculating a total sum.

In the basic radial basis function network, the p(x) term of Equation 1 may not exist. The term p(x) in Equation 1, is a polynomial term which may be an added term to improve the deformation. In this case, a result of inputting the x value into a polynomial function may be used.

Examples of the radial basis function φ may include various types of functions. Here, the radial basis function φ may be a thin plate spline function used for deformation of the image and the mesh.

The entire face portion 210 (FIG. 2) of the input color image 200 (FIG. 2) may be synthesized with the template texture 300 (FIG. 3) using the first transform function ƒ(x) obtained through the above scheme.

Figure 6:
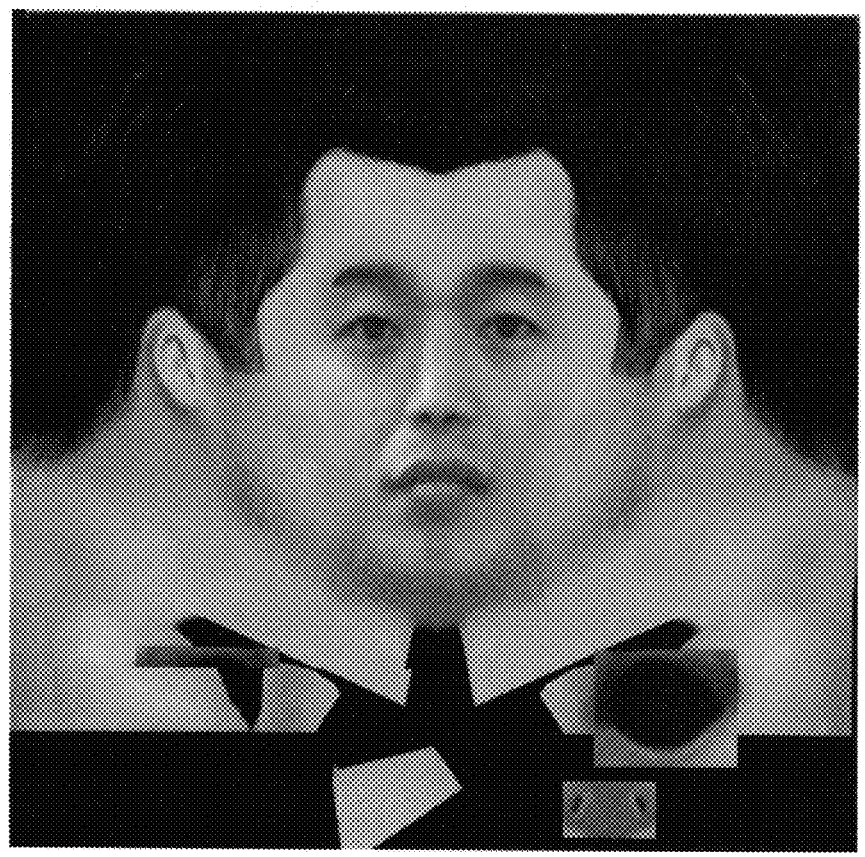
FIG. 6 illustrates a first texture generated by synthesizing a face portion extracted from the input color image of FIG. 2 and the template texture of FIG. 3 according to an embodiment.

FIG. 6 illustrates a first texture 600 generated by synthesizing the face portion 210 (FIG. 2) extracted in the input color image 200 of FIG. 2 and the template texture 300 of FIG. 3 according to an embodiment.

In the first texture 600, a face portion is obtained from the input color image 200 (FIG. 2) and the remaining portions are obtained from the template texture 300 (FIG. 3).

In the first texture 600, shapes of major face portions, for example, an eyebrow portion, an eye portion, a nose portion, a lip portion, and the like may be similar to corresponding portions of the input color image 200, however, there may exist differences in minute shapes or relative locations.

In this case, a color tone, a skin pattern, and the like of the face portion 210 (FIG. 2) of the input color image 200 (FIG. 2) may be applied to the entire skin of the template texture 300. Through this, since the entire skin tone of the first texture 600 may look uniform, a quality of a 3D facial model may be enhanced.

The template texture 300 (FIG. 3) may be stored together with a template mesh model corresponding to the template texture 300 (FIG. 3). Hereinafter, the template mesh model will be described with reference to FIG. 7.

Figure 7:
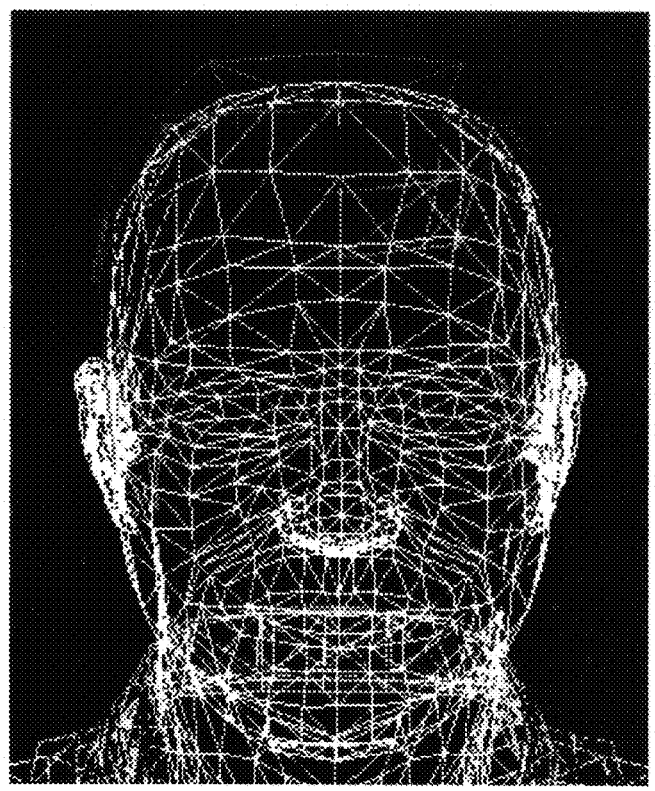
FIG. 7 illustrates an example of a template mesh model used in an image processing apparatus according to an embodiment.

FIG. 7 illustrates a template mesh model 700 used in an image processing apparatus according to an embodiment.

3D geometry information may be classified into a mesh-based scheme and a point-based scheme. Herein, the 3D geometry information may be the mesh-based scheme. Meshes may be expressed based on a triangular unit. Each triangle may be referred to as a vertex. An example of one of the many vertexes in FIG. 7 is shown by vertex 710.

Each of vertexes may be mapped with a particular color value in the template texture 300 (FIG. 3). When color values of the template texture 300 (FIG. 3) are applied to the vertexes of the template mesh model 700, a 3D facial model may be generated.

The 3D facial model may be generated by applying the synthesized first texture 600 (FIG. 6) to the template mesh model 700. In this case, a facial shape of a particular human being may be modeled into a head shape different from a head shape of the particular human being by providing various template mesh models.

Various types of applications may be used. For example, in the industry fields of a video game, a virtual reality, a plastic surgery simulation, and the like, a 3D facial model may be generated by mapping a face of a particular human being and a head shape of a different human being.

Another 3D facial model may be generated by transforming the template mesh model 700 to be in a random shape, and by applying the transformed template mesh model 700 to the first texture 600 (FIG. 2).

Also, the 3D facial model may be generated to have the same head shape as the face of the color input image 200 (FIG. 2) used to generate the first texture 600 (FIG. 6). It will be described hereinafter with reference to FIG. 8.

Figure 8:
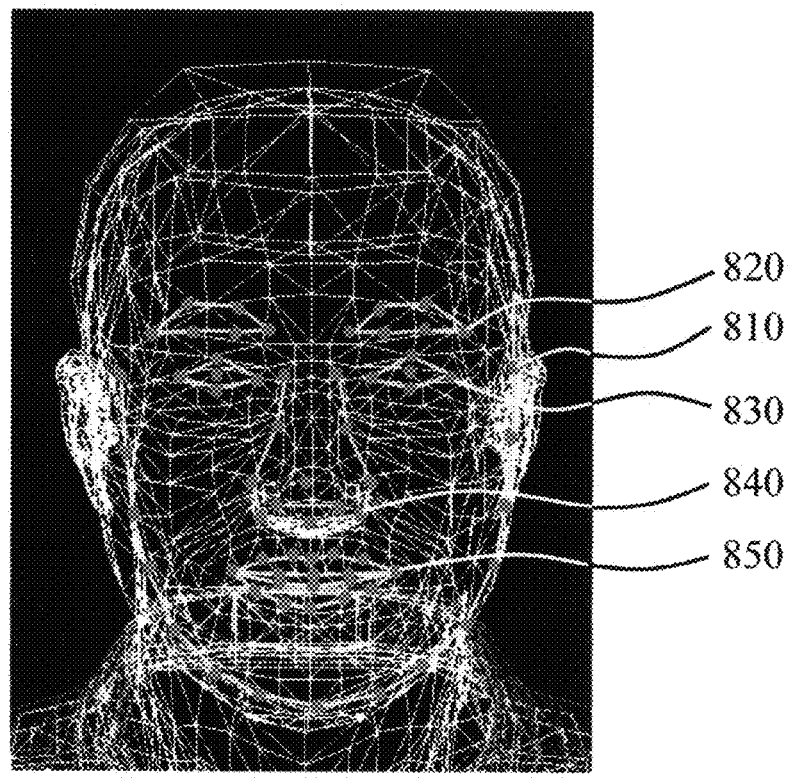
FIG. 8 illustrates an example of an image of indicating characteristic points to identify a facial area in the template mesh model of FIG. 7 according to an embodiment.

FIG. 8 illustrates a result 800 of indicating characteristic points to identify a facial area in the template mesh model 700 of FIG. 7 according to an embodiment.

Like the template texture 300 (FIG. 3), information regarding the characteristic points to identify a face outline portion 810, an eyebrow portion 820, an eye portion 830, a nose portion 840, and a lip portion 850 may be given in the template mesh model 700 (FIG. 7).

When transforming the template mesh model 700 (FIG. 7) to be in a random face shape, that is, a head shape, or to be in a particular head shape corresponding to the input color image 200 (FIG. 2), the characteristic points of the template mesh model 700 (FIG. 7) may be used.

In this case, there is a need to calculate a second transform function to transform the characteristics points of the template mesh model 700 (FIG. 7) to characteristic points of another head shape.

In one implementation embodiment, the second transform function may be given in advance. Here, when the template mesh model is transformed to be in the head shape corresponding to the input color image 200 (FIG. 2), there is a need for a separate calculation scheme.

Figure 9:
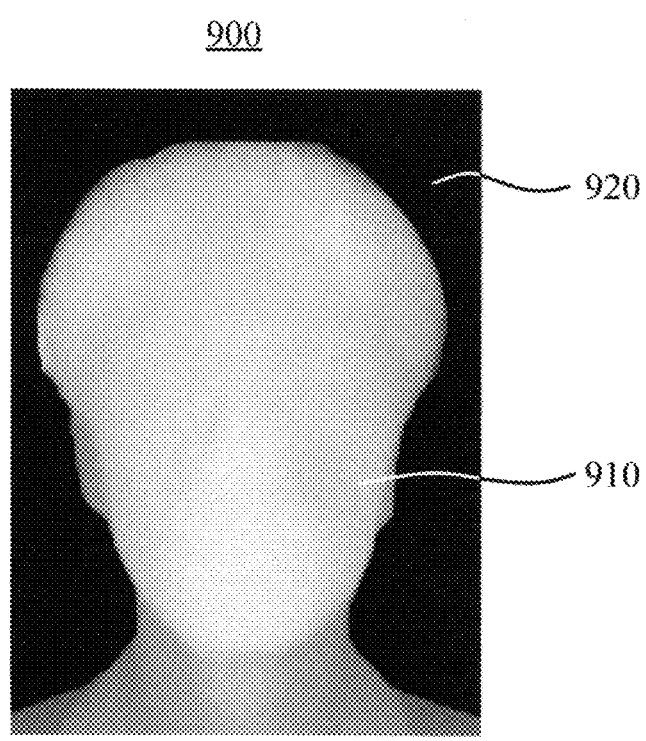
FIG. 9 illustrates an example of a depth image input into an image processing apparatus according to an embodiment.

FIG. 9 illustrates a depth image 900 input into an image processing apparatus according to an embodiment.

The depth image 900 may match the input color image 200 of FIG. 2. Due to a degraded hardware performance of a depth camera, a depth image obtained with respect to a particular object may have a relatively low resolution in comparison to a color image obtained with respect to the particular object.

There may exist minute differences in a relative location, a viewpoint, and the like, between a camera lens and the particular object. Therefore, there is a need for a process of accurately matching the minute differences using an image processing method.

The depth image 200 (FIG. 2) may match the color input image 200 (FIG. 2) through the above process.

When the depth image 900 and the color image 200 (FIG. 2) match each other, information associated with the characteristic points extracted from the input color image 200 (FIG. 2) may be applicable to the depth image 900 as is. Accordingly, there is no need to calculate the characteristic points of the depth image 900.

Accordingly, the depth image 900 may be immediately separated into a face portion 910 and a background portion 920.

Figure 10:
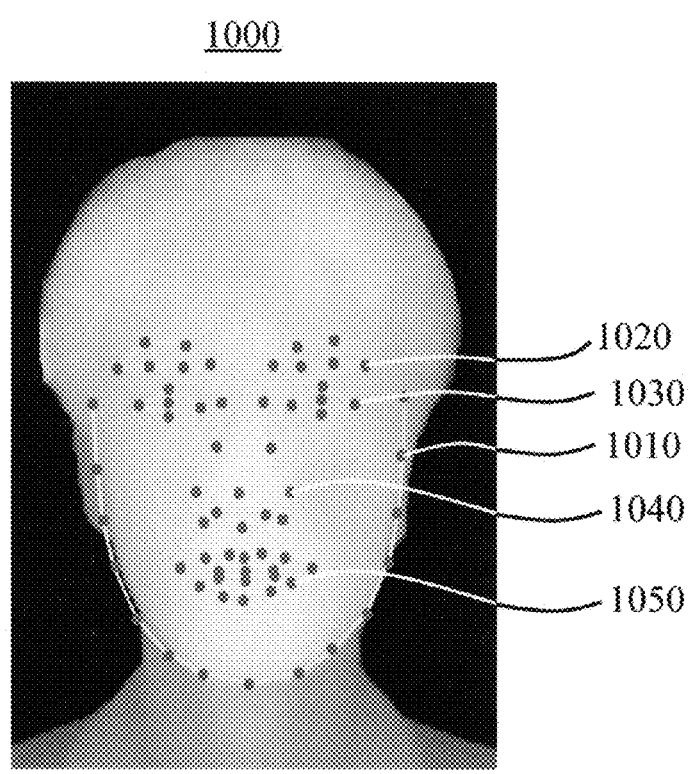
FIG. 10 illustrates an image indicating characteristic points to identify a facial area in the depth image of FIG. 9 according to an embodiment.

FIG. 10 illustrates a result 1000 of indicating characteristic points to identify a facial area in the depth image 900 of FIG. 9 according to an embodiment.

The characteristic points may identify a face outline portion 1010, an eyebrow portion 1020, an eye portion 1030, a nose portion 1040, and a lip portion 1050, respectively, in the depth image 900 (FIG. 9).

A second transform function between the characteristic points of the template mesh model 700 (FIG. 7) shown in FIG. 8, and the characteristic points of the depth image 900 (FIG. 9) shown in FIG. 10 may be calculated.

In this case, the second transform function may be calculated using a radial basis function network.

When the calculated second transform function is applied to the entire set of vertexes of the template mesh model 700 (FIG. 7), a first mesh model may be generated to have the same head shape as the depth image 900 (FIG. 9) and the input color image 200 (FIG. 2).

Figure 11:
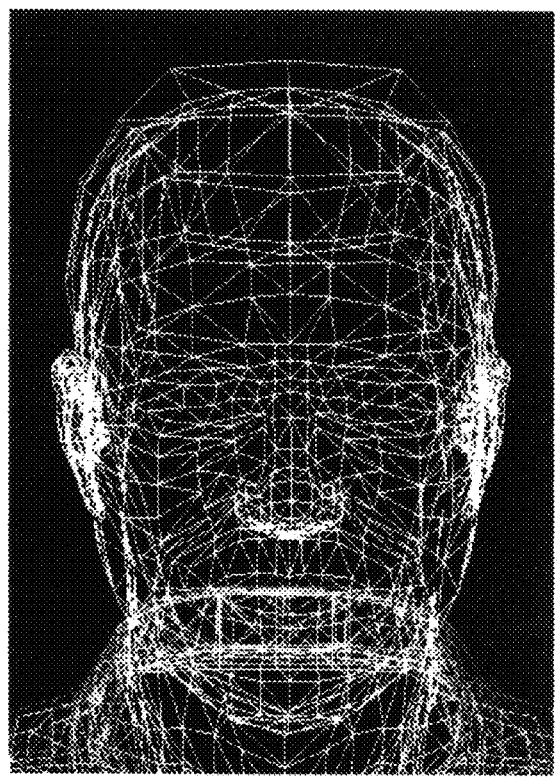
FIG. 11 illustrates a first mesh model generated by applying a second transform function to an entire set of vertexes of the template mesh model of FIG. 7, and by matching the template mesh model of FIG. 7 and the depth image of FIG. 9 according to an embodiment.

FIG. 11 illustrates a first mesh model 1100 generated by applying a second transform function to the entire set of vertexes of the template mesh model 700 of FIG. 7, and matching the template mesh model 700 (FIG. 7) and the depth image 900 of FIG. 9 according to an embodiment.

The first mesh model 1100 may have the same head shape as the depth image 900 (FIG. 9) and the input color image 200 (FIG. 2). Accordingly, when the generated first texture 600 (FIG. 6) is applied to the first mesh model 1100, a 3D facial model similar to the input color image 200 may be generated.

Here, a hair portion of the first texture 600 (FIG. 6) reflects hair of the original template texture 300 (FIG. 3) as is. Accordingly, a hair portion of the generated 3D facial model may be different from the input color image 200 (FIG. 2).

The hair portion may be separately corrected, which will be described with reference to FIGS. 12 and 13.

Figure 12:
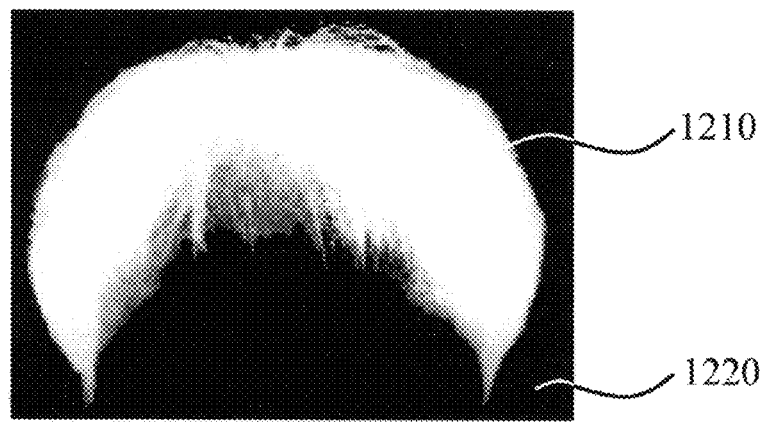
FIG. 12 illustrates an image of extracting a hair portion from the input color image of FIG. 12 according to an embodiment.

FIG. 12 illustrates a result 1200 of extracting a hair portion 1210 from the input color image 200 of FIG. 2 according to an embodiment.

The hair portion 1210 may be extracted from the input color image 200 (FIG. 2) using various types of schemes.

The input color image 200 (FIG. 2) may be separated into the hair portion 1210 and a background portion 1220 by performing high pass filtering (HPF) for the input color image 200 (FIG. 2).

Also, the hair portion 1210 may be extracted using hue values of pixels constituting the input color image 200 (FIG. 2).

A hair model having a hair portion most similar to the extracted hair portion 1210 may be retrieved from a hair model database.

Figure 13:
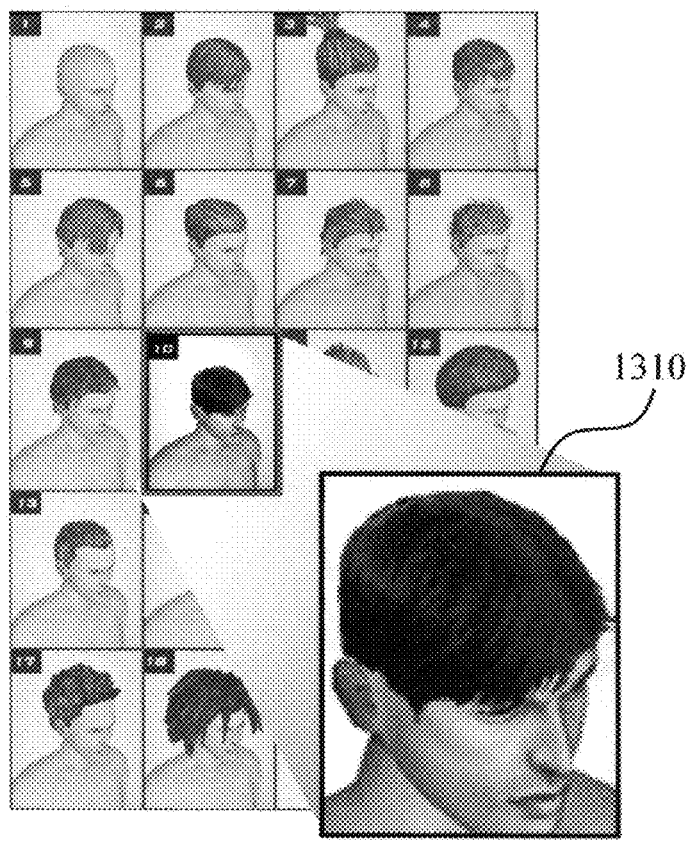
FIG. 13 illustrates an example of selecting, from a hair model database, a hair model having a hair portion similar to the extracted hair portion of FIG. 12 according to an embodiment.

FIG. 13 illustrates an example of selecting, from a hair model database 1300, a hair model 1310 having a hair portion similar to the extracted hair portion 1210 of FIG. 12 according to an embodiment.

The hair model database 1300 may store various 3D hair models.

The hair model 1310 having the hair portion most similar to the extracted hair portion 1210 may be selected from the hair model database 1300.

A 3D facial model with even a hair portion similar to the color input image 200 (FIG. 2) may be generated by reflecting the selected hair model 1310 in the first texture 600 (FIG. 6) and the first mesh model 1100 (FIG. 11).

Figure 14:
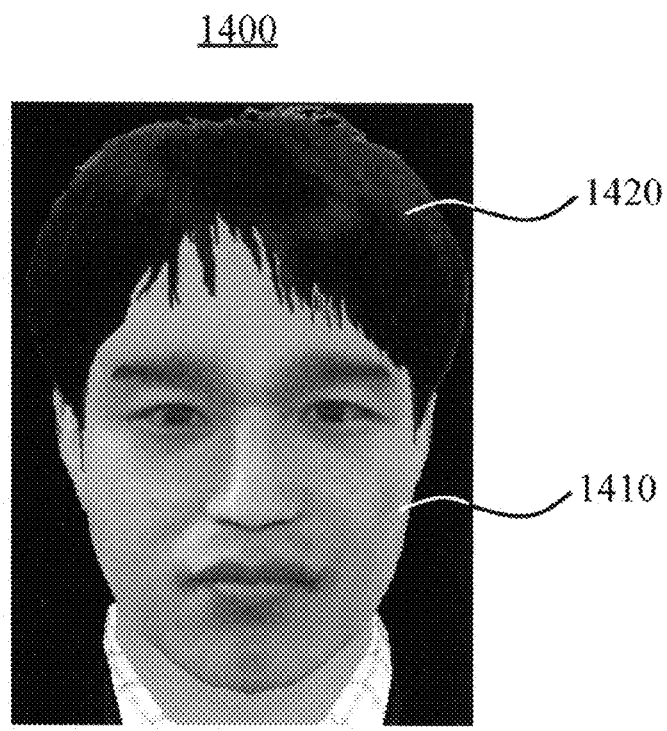
FIG. 14 illustrates an example of an image rendered from a generated 3D facial model in a front view according to an embodiment.

FIG. 14 illustrates a result 1400 of rendering a generated 3D facial model in a front view according to an embodiment.

Referring to FIG. 14, a face portion 1410 may be generated based on the first texture 600 (FIG. 6) and the first mesh model 1100 (FIG. 11). A hair portion 1420 may be generated based on the selected hair model 1310 of FIG. 13.

Figure 15:
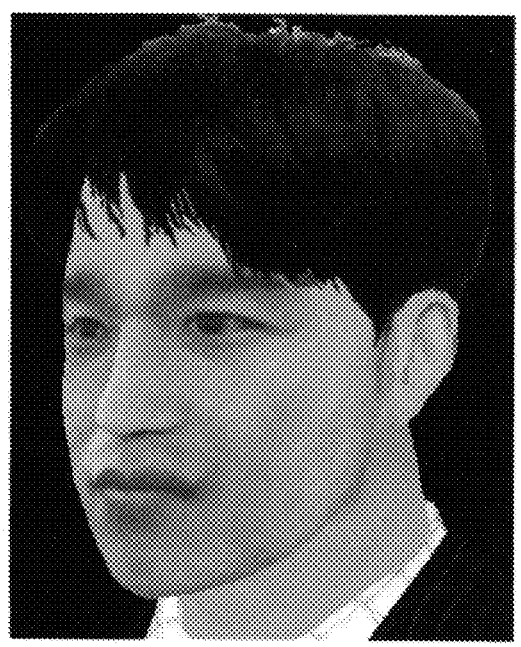
FIG. 15 illustrates an example of an image of rendered from a generated 3D facial model in a side view according to an embodiment.

FIG. 15 illustrates a result 1500 of rendering a generated 3D facial model in a side view according to an embodiment.

Figure 16:
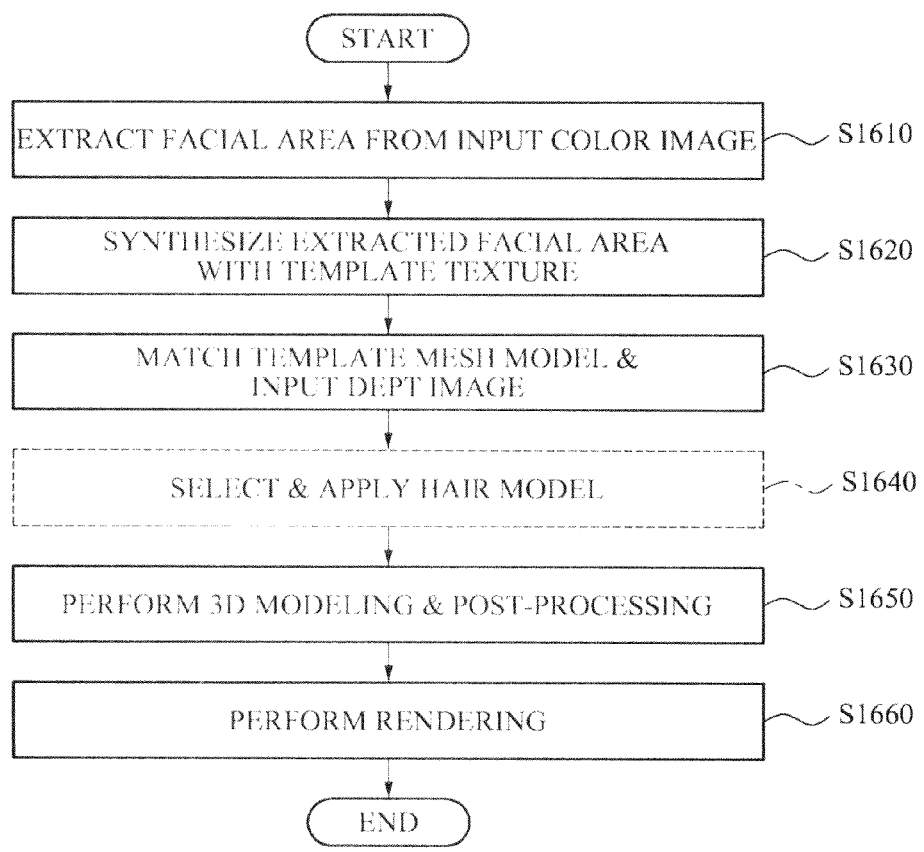
FIG. 16 illustrates an image processing method according to an embodiment.

FIG. 16 illustrates an image processing method according to an embodiment.

In operation S1610, the face portion 210 (FIG. 2) may be extracted from the input color image 200 (FIG. 2). A process of extracting characteristic points is described above with reference to FIGS. 2 and 4.

In operation S1620, referring to FIGS. 2, 3, and 6, the first texture 600 may be generated by synthesizing the extracted face portion 210 and the template texture 300. Here, a process of calculating the first transform function to transform the extracted face portion 210 to the face portion of the template texture 300 is described above with reference to FIGS. 2 through 4, and the above Equation 1.

In operation S1630, referring to FIGS. 2, 3, 7, 9 and 11, the template mesh model 700 corresponding to the template texture 300 may be transformed.

In this case, the template mesh model 700 may be transformed to be in a random head shape.

To transform the template mesh model 700 to be in the same head shape as the input color image 200, the first mesh model 1100 may be generated by matching the template mesh model 700 and the depth image 900 that is matched with the input color image 200.

According to an embodiment, while matching the template mesh model 700 and the matched depth image 900 of the input color image 200, a process of calculating the second transform function between the characteristic points of the template mesh model 700 and the characteristic points of the depth image 900, and applying the second transform function to the entire vertexes of the template mesh model 700 may be performed. The above process is described with reference to FIGS. 10 and 11.

Through the above process, the 3D facial model may be generated using the first texture 600 and the first mesh model 1100.

According to another embodiment, in operation S1640, the hair portion 1210 may be extracted from the input color image 200, and the hair model 1310 having a hair portion most similar to the extracted hair portion 1210 may be retrieved from the hair model database 1300. The retrieved hair model 1310 may be used to generate the 3D facial model together with the first texture 600 (FIG. 6) and the first mesh model 1100. The above process is described above with reference to FIGS. 12 and 13.

In operation S1650, the 3D facial model may be generated. In one implementation embodiment, the generated 3D facial model may be corrected by performing post-processing.

In operation S1660, the 3D facial model generated by modeling the input color image 200 (FIG. 2) may be rendered. It is described above with reference to FIGS. 14 and 15.

The image processing method according to the above-described embodiments may also be implemented through computer readable code/instructions in/on a medium, e.g., a computer readable medium, to control at least one processing element to implement any above described embodiment. The medium can correspond to medium/media permitting the storing or transmission of the computer readable code.

The computer readable code can be recorded or transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media. The media may also be a distributed network, so that the computer readable code is stored or transferred and executed in a distributed fashion. Still further, as only an example, the processing element could include a processor or a computer processor, and processing elements may be distributed or included in a single device.

In addition to the above described embodiments, example embodiments can also be implemented as hardware, e.g., at least one hardware based processing unit including at least one processor capable of implementing any above described embodiment.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
   a first processor to generate a first texture by synthesizing a template texture and a facial area extracted from an input color image;
   a second processor to generate a first mesh model by matching both a template mesh model corresponding to the template texture and a depth image corresponding to the input color image; and
   a three dimensional (3D) model generator to generate a 3D facial model based on the first texture and the first mesh model.

2. The image processing apparatus of claim 1, wherein the first processor comprises:
   an extractor to extract a characteristic point of the input color image identifying the facial area within the input color image;
   a first calculator to calculate a first transform function between the characteristic point of the input color image and a characteristic point of the template texture; and
   a texture synthesizer to generate the first texture by synthesizing the facial area and the template texture through an application of the first transform function to pixels of the facial area of the input color image.

3. The image processing apparatus of claim 2, wherein the extractor extracts the characteristic point of the input color image using an active shape model.

4. The image processing apparatus of claim 2, wherein the first calculator calculates the first transform function using a radial basis function network.

5. The image processing apparatus of claim 2, wherein the texture synthesizer adjusts a color tone of the template texture using a color tone of the facial area of the input color image.

6. The image processing apparatus of claim 1, wherein the second processor comprises:
   a second calculator to calculate a second transform function between a characteristic point of the template mesh model corresponding to the template texture and a characteristic point of the depth image corresponding to the input color image; and
   a mesh matching unit to generate the first mesh model by matching the template mesh model and the depth image through an application of the second transform function to an entire set of vertexes of the template mesh model.

7. The image processing apparatus of claim 6, wherein the second calculator calculates the second transform function using a radial basis function network.

8. The image processing apparatus of claim 1, wherein the 3D model generator extracts a hair portion from the input color image, selects, from a plurality of pre-stored hair models, a hair model having a hair portion similar to the extracted hair portion, and synthesizes the selected hair model with the 3D facial model.

9. An image processing apparatus comprising:
   a first processor to generate a first texture by synthesizing a template texture and a facial area extracted from an input color image;
   a second processor to transform, to a first mesh model, a template mesh model corresponding to the template texture; and
   a 3D model generator to generate a 3D facial model based on the first mesh model and the template texture.

10. An image processing method, comprising:
    generating, using a processor, a first texture by synthesizing a template texture and a facial area extracted from an input color image;
    generating, using a processor, a first mesh model by matching both a template mesh model corresponding to the template texture and a depth image corresponding to the input color image; and
    generating a 3D facial model based on the first texture and the first mesh model.

11. The image processing method of claim 10, wherein the generating of the first texture comprises:
    extracting a characteristic point of the input color image identifying the facial area within the input color image;
    calculating a first transform function between the characteristic point of the input color image and a characteristic point of the template texture; and
    generating the first texture by synthesizing the facial area and the template texture through an application of the first transform function to pixels of the facial area of the input color image.

12. The image processing method of claim 11, wherein the characteristic point of the input color image is extracted using an active shape model.

13. The image processing method of claim 11, wherein the first transform function is calculated using a radial basis function network.

14. The image processing method of claim 11, wherein the generating of the first texture further comprises:
    adjusting a color tone of the template texture using a color tone of the facial area of the input color image.

15. The image processing method of claim 10, wherein the generating of the first mesh model comprises:
    calculating a second transform function between a characteristic point of the template mesh model corresponding to the template texture and a characteristic point of the depth image corresponding to the input color image; and
    generating the first mesh model by matching the template mesh model and the depth image through an application of the second transform function to an entire set of vertexes of the template mesh model.

16. The image processing method of claim 15, wherein the second transform function is calculated using a radial basis function network.

17. The image processing method of claim 10, wherein the generating of the 3D facial model comprises:
    extracting a hair portion from the input color image;
    selecting, from a plurality of pre-stored hair models, a hair model having a hair portion similar to the extracted hair portion; and
    synthesizing the selected hair model with the 3D facial model.

18. An image processing method, comprising:
    Generating, using a processor, a first texture by synthesizing a template texture and a facial area extracted from an input color image; and Generating, using a processor, a 3D facial model based on the first texture and a template mesh model corresponding to the template texture.

19. The image processing method of claim 18, wherein the generating of the 3D facial model comprises:

transforming, to a first mesh model, the template mesh model corresponding to the template texture; and generating the 3D facial model based on the first mesh model and the template texture.

20. A non-transitory computer readable recording medium storing a program to cause at least one processing element to implement the method of claim 10.

* * * * *

UNITED STATES PATENT AND TRADEMARK OFFICE
CERTIFICATE OF CORRECTION

PATENT NO. : 8,537,155 B2  
APPLICATION NO. : 12/662855  
DATED : September 17, 2013  
INVENTOR(S) : Hwa Sup Lim Page 1 of 1

It is certified that error appears in the above-identified patent and that said Letters Patent is hereby corrected as shown below:

In the Claims:

In Column 12, Line 65, In Claim 18, delete "Generating," and insert -- generating, --, therefor.
In Column 13, Line 1, In Claim 18, delete "Generating," and insert -- generating, --, therefor.

Signed and Sealed this
Eleventh Day of February, 2014

Michelle K. Lee
*Deputy Director of the United States Patent and Trademark Office*